United States Patent [19]
Hayashi et al.

[11] Patent Number: 5,901,128
[45] Date of Patent: May 4, 1999

[54] RECORDED INFORMATION REPRODUCING APPARATUS

[75] Inventors: Hideki Hayashi; Hideki Kobayashi, both of Tsurugashima; Masaru Umezawa, Tokorozawa, all of Japan

[73] Assignee: Pioneer Electronic Corporation, Tokyo, Japan

[21] Appl. No.: 08/854,678

[22] Filed: May 12, 1997

[30] Foreign Application Priority Data

| May 14, 1996 | [JP] | Japan | .................................... 8-118972 |
| May 27, 1996 | [JP] | Japan | .................................... 8-131786 |

[51] Int. Cl.$^6$ ..................................................... G11B 7/00
[52] U.S. Cl. ............................................. 369/59; 369/124
[58] Field of Search ............................... 369/59, 124, 47, 369/48, 54; 360/51, 40, 32

[56] References Cited

U.S. PATENT DOCUMENTS

| 5,249,169 | 9/1993 | Ogawa ........................................ 369/48 |
| 5,517,476 | 5/1996 | Hayashi ...................................... 369/48 |
| 5,548,570 | 8/1996 | Hirajima et al. ........................... 369/59 |
| 5,673,211 | 9/1997 | Hayashi et al. ........................... 364/607 |
| 5,710,750 | 1/1998 | Tachibana .................................. 369/124 |
| 5,742,576 | 4/1998 | Hayashi et al. ........................... 369/124 |

*Primary Examiner*—Thang V. Tran
*Attorney, Agent, or Firm*—Sughrue, Mion, Zinn Macpeak & Seas, PLLC

[57] ABSTRACT

A recorded information reproducing apparatus is capable of highly reliably reproducing information even from a recording medium on which recorded information including recorded signals in a low frequency band are recorded at a high density. An error voltage is subtracted from an analog read signal read from a recording medium to generate a corrected read signal. The corrected read signal is sampled to be converted into a digital corrected read sample sequence from which recorded information is decoded. Here, the sample existing at a position nearest to each zero-cross point in the corrected read sample sequence is extracted from the corrected read sample sequence to generate an extracted sample sequence. Each sample in the extracted sample sequence is converted into an analog signal having a level corresponding to the associated sample value. This analog signal is used as the above error voltage.

9 Claims, 13 Drawing Sheets

RECORDED INFORMATION REPRODUCING APPARATUS

BACKGROUND OF THE INVENTION

1. Field of the Invention

The present invention relates to a recorded information reproducing apparatus for reproducing information data from a recording medium having the information data recorded thereon.

2. Description of the Related Art

In recent years, a DVD (digital video disc) has been attracting more attention as a recording medium for providing high density recording of information data such as digital audio data, digital video data, computer data and so on.

Information data is recorded in accordance with 8/16 modulation encoding on the DVD instead of EFM encoding as is the case of CD. However, the 8/16 modulation encoding suppresses low frequency components in accordance with the order of code sequence based on the probability, rather than suppressing low frequency components for each word as does the EFM encoding, so that a large amount of low frequency components may possibly remain in reproduced information.

Further, since information data is recorded at a higher density on a DVD than on a CD, the DVD is more susceptible to fluctuations in characteristics of the disc itself, and errors in a variety of servo mechanisms in a reproducing apparatus, when the information data is read, thereby increasing the error ratio of reproduced data.

OBJECTS AND SUMMARY OF THE INVENTION

It is therefore an object of the present invention to provide a recorded information reproducing apparatus which is capable of highly reliably reproducing information even from a recording medium having information recorded thereon in a digital signal form which may include low frequency components.

To achieve the above object, the present invention provides a recorded information reproducing apparatus for reproducing recorded information recorded on a recording medium, which comprises information reading means for reading recorded information from the recording medium to generate an analog read signal; a subtracter for subtracting an error voltage from the read signal to generate a corrected read signal; an A/D converter for sampling the corrected read signal to convert the corrected read signal into a digital corrected read sample sequence; decoding means for decoding the recorded information from the corrected read sample sequence; sample extracting means for extracting only the sample existing at the position nearest to each zero-cross point in the corrected read sample sequence to generate an extracted sample sequence; and error voltage generating means for converting each sample in the extracted sample sequence into an analog signal as the error voltage.

DESCRIPTION OF THE PREFERRED EMBODIMENTS

Several embodiments of the present invention will hereinafter be described in detail with reference to the accompanying drawings.

Figure 1:
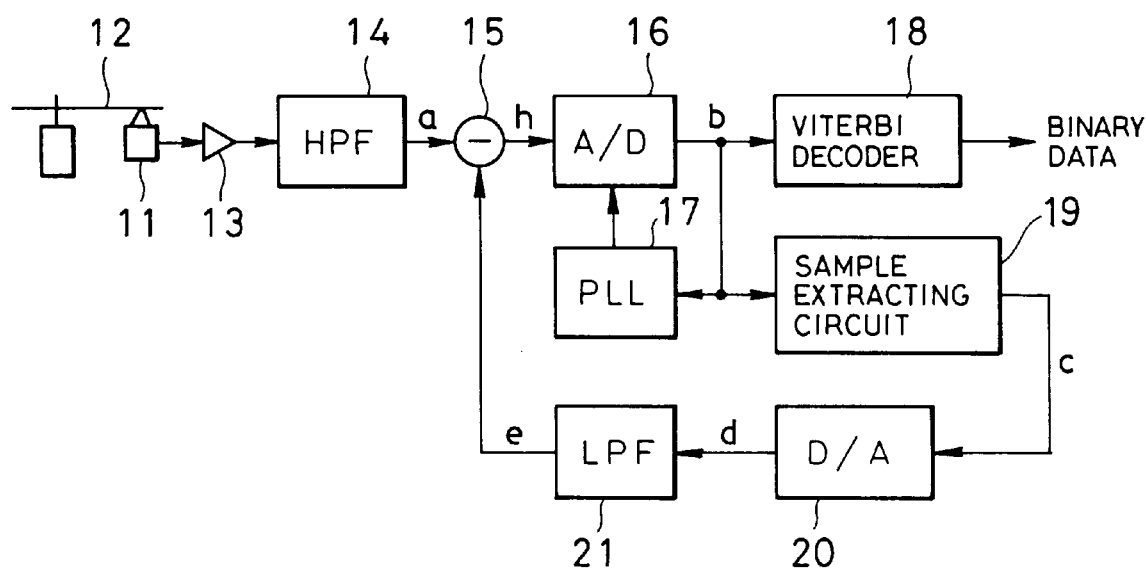
FIG. 1 is a block diagram illustrating the configuration of a recorded information reproducing apparatus according to the present invention.

FIG. 1 is a block diagram illustrating the configuration of a recorded information reproducing apparatus according to the present invention.

Referring specifically to FIG. 1, a recording disc 12 loaded in the recorded information reproducing apparatus, which may be a DVD by way of example, has information data such as digital audio data, digital video data, and computer data recorded thereon at a high density. A pickup 11 reads recorded information from the recording disc 12 and supplies the resulting analog read signal to an RF amplifier 13. The RF amplifier 13 amplifies the read signal as desired and supplies the amplified read signal to an HPF (high pass filter) 14. The HPF 14 has its cutoff frequency set in a lower frequency range to mainly remove a direct current component from the read signal amplified by the RF amplifier 13 to generate a read signal "a" which is then supplied to a subtracter 15.

The subtracter 15 subtracts an error voltage "e", later described, from the read signal "a" to generate a corrected read signal "h", which is supplied to an A/D converter 16. The A/D converter 16 samples the corrected read signal "h" in accordance with a sampling clock signal supplied thereto from a PLL (phase locked loop) circuit 17, later described, to convert the corrected read signal "h" into a digital corrected read sample sequence "b". A PLL 17 generates a clock signal, synchronized in phase with the corrected read sample sequence "b", which is supplied to the A/D converter 16 as the sampling clock signal. A Viterbi decoder 18 decodes the most likely binary reproduced data based on the corrected read sample sequence "b" and outputs the binary reproduced data.

Figure 2:
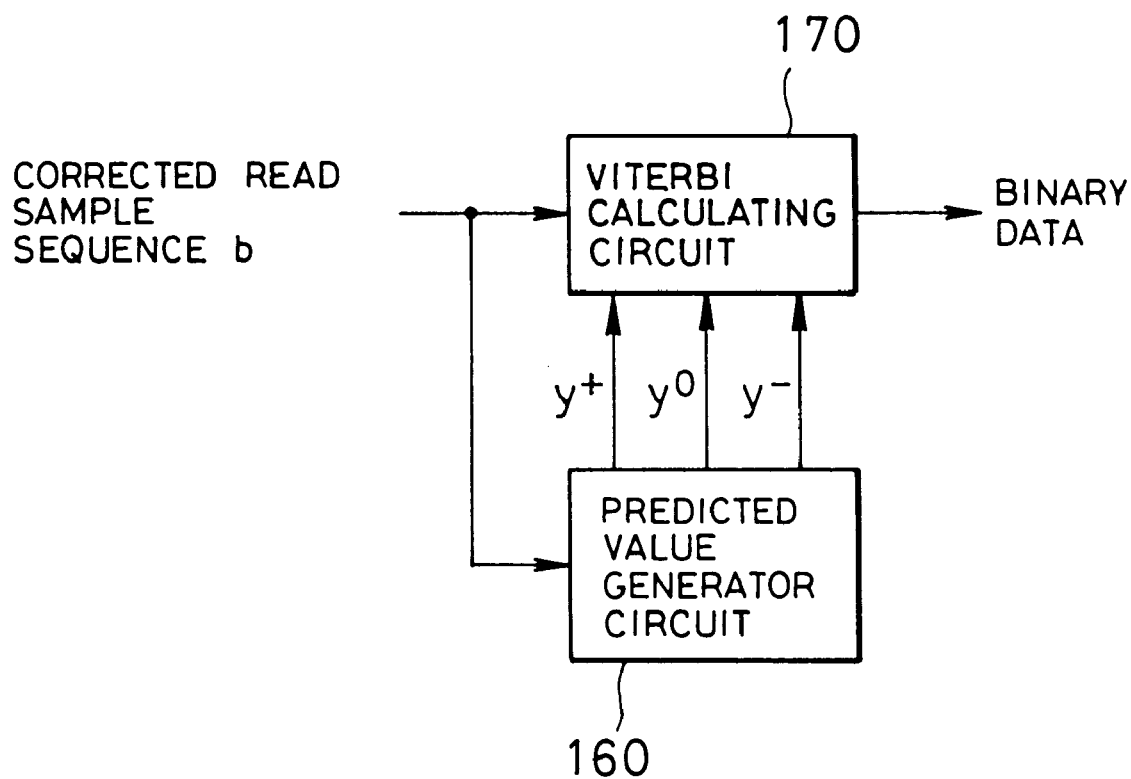
FIG. 2 is a block diagram illustrating the internal configuration of a Viterbi decoder 18.

FIG. 2 is a block diagram illustrating the internal configuration of the Viterbi decoder 18 mentioned above. Referring specifically to FIG. 2, a predicted-value generator circuit 160 extracts a zero-cross sample existing at the position nearest to each zero-cross point, and a positive polarity sample and a negative polarity sample positioned before and after the zero-cross sample from the corrected read sample sequence "b". Next, respective average levels of the zero-cross samples, the positive polarity samples, and the negative polarity samples are calculated and supplied to a Viterbi calculating circuit 170 as a predicted value "y0", a predicted value "y+", and a predicted value "y−", respectively. The Viterbi calculating circuit 170 calculates square errors between the corrected read sample sequence "b" and each of the predicted value "y0", the predicted value "y+", and the predicted value "y−", and determines the data sequence presenting the smallest accumulated value of the square error as the most likely binary data sequence.

Figure 3:
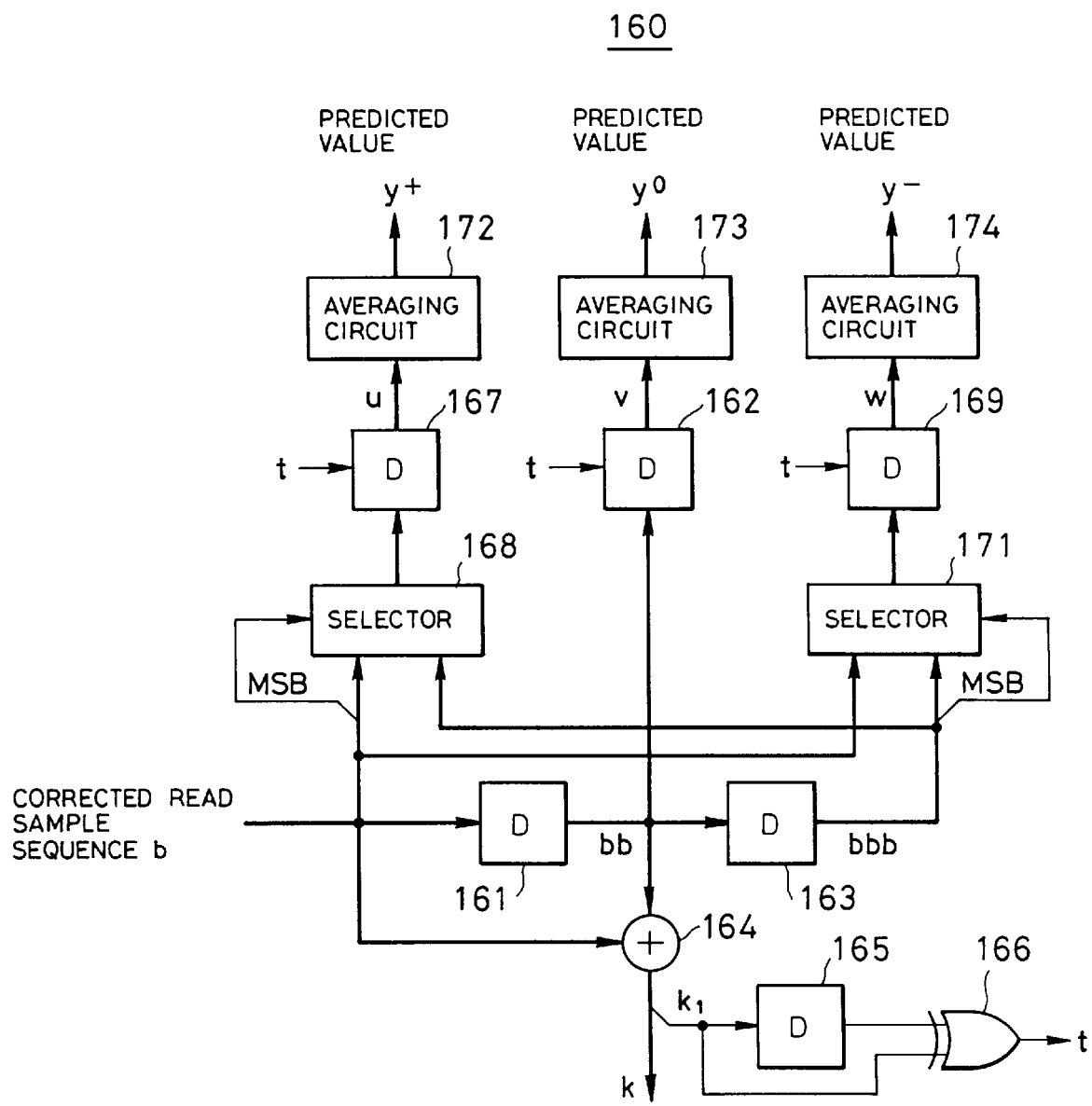
FIG. 3 is a block diagram illustrating the internal configuration of a predicted-value generator circuit 160.
Figure 4:
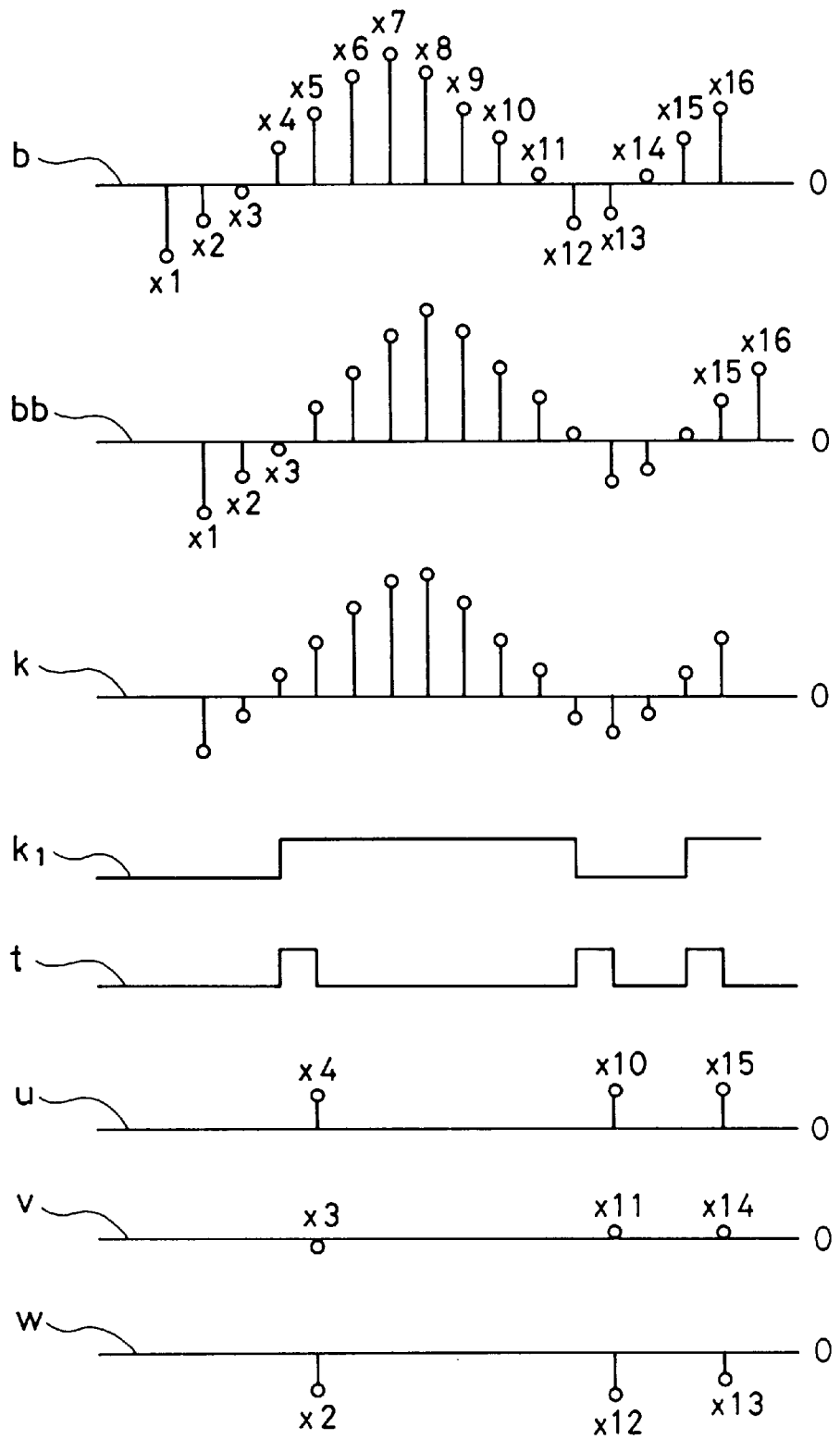
FIG. 4 shows internal operational waveforms of the predicted-value generator circuit 160.

FIG. 3 is a block diagram illustrating an exemplary internal configuration of the predicted-value generator circuit 160, and FIG. 4 shows examples of internal operational waveforms of the predicted-value generator circuit 160 illustrated in FIG. 3.

Referring specifically to FIG. 3, a D-type flip-flop 161 delays the corrected read sample sequence "b" supplied from the A/D converter 16 as mentioned above by one sampling clock to generate a delayed read sample sequence "bb" which is then supplied to each of D-type flip-flops 162, 163 and an adder 164, respectively. The D-type flip-flop 163 again delays the delayed read sample sequence "bb" by one sampling clock to generate a delayed read sample sequence "bbb" which is supplied to selectors 168, 171, respectively.

The adder 164 adds the corrected read sample sequence "b" and the delayed read sample sequence "bb" to generate an interpolated read sample sequence "k". The MSB (most significant bit) of the interpolated read sample sequence "k" is supplied to a zero-cross timing detector circuit composed of a D-type flip-flop 165 and an exclusive OR circuit 166. The zero-cross timing detector circuit generates a zero-cross timing signal "t" when it detects a transition from "1" to "0" or from "0" to "1" of a signal logical value of the bit signal k1, which is the MSB of the interpolated read sample sequence "k", i.e., when the polarity of the interpolated read sample sequence has changed. The zero-cross timing signal "t" is supplied to the D-type flip-flops 167, 162, 169, respectively.

The selector 168 supplies the corrected read sample sequence "b" to the D-type flip-flop 167 when the MSB of the corrected read sample sequence "b" has a logical signal value "0", i.e., when a sample value in the corrected read sample sequence "b" has the positive polarity. On the other hand, the selector 168 supplies the delayed read sample sequence "bbb" to the D-type flip-flop 167 when the MSB of the corrected sample sequence "b" has a logical signal value "1", i.e., when a sample value in the corrected read sample sequence "b" has the negative polarity.

The selector 171 supplies the corrected read sample sequence "b" to the D-type flip-flop 169 when the MSB of the delayed read sample sequence "bbb" has a logical signal value "0", i.e., when a sample value in the delayed read sample sequence "bbb" has the positive polarity. On the other hand, the selector 171 supplies the delayed read sample sequence "bbb" to the D-type flip-flop 169 when the MSB of the delayed read sample sequence "bbb" has a logical signal value "1", i.e., when a sample value in the delayed read sample sequence "bbb" has the negative polarity.

The D-type flip-flop 167 fetches the read sample sequence supplied from the selector 168 (either the corrected read sample sequence "b" or the delayed read sample sequence "bbb") only when the zero-cross timing signal "t" is supplied thereto, and supplies the fetched read sample sequence to an averaging circuit 172 as a positive polarity sample "u". The averaging circuit 172, which comprises, for example, an IIR (infinite impulse response) digital filter and so on, calculates an average value of the positive polarity samples "u" and outputs the average value as a predicted value "y+".

The D-type flip-flop 162 fetches the delayed read sample sequence "bb" only when the zero-cross timing signal "t" is supplied thereto, and supplies the delayed read sample sequence "bb" to an averaging circuit 173 as a zero-cross sample "v". The averaging circuit 173, which comprises, for example, an IIR digital filter and so on, calculates an average value of the zero-cross samples "v" and outputs the average value as a predicted value "y0".

The D-type flip-flop 169 fetches the read sample sequence supplied from the selector 171 (either the corrected read sample sequence "b" or the delayed read sample sequence "bbb") only when the zero-cross timing signal "t" is supplied thereto, and supplies the fetched read sample sequence to an averaging circuit 174 as a negative polarity sample "w". The averaging circuit 174, which comprises, for example, an IIR digital filter and so on, calculates an average value of the negative polarity samples "w" and outputs the average value as a predicted value "y−".

Stated another way, when a zero-cross timing is detected from the corrected read sample sequence "b", each of the selectors 168, 171 is supplied with a read sample value one sampling clock before the zero-cross timing and a read sample value one sampling clock after the zero-cross timing. The read sample values existing before and after the zero-cross timing have the polarities opposite to each other. Thus, the D-type flip-flop 167 fetches the sample value of the positive polarity from the read sample values existing before and after the zero-cross timing as the positive polarity sample "u". The D-type flip-flop 169 fetches the sample value of the negative polarity from the read sample values existing before and after the zero-cross timing as the negative polarity sample "w".

Figure 5:
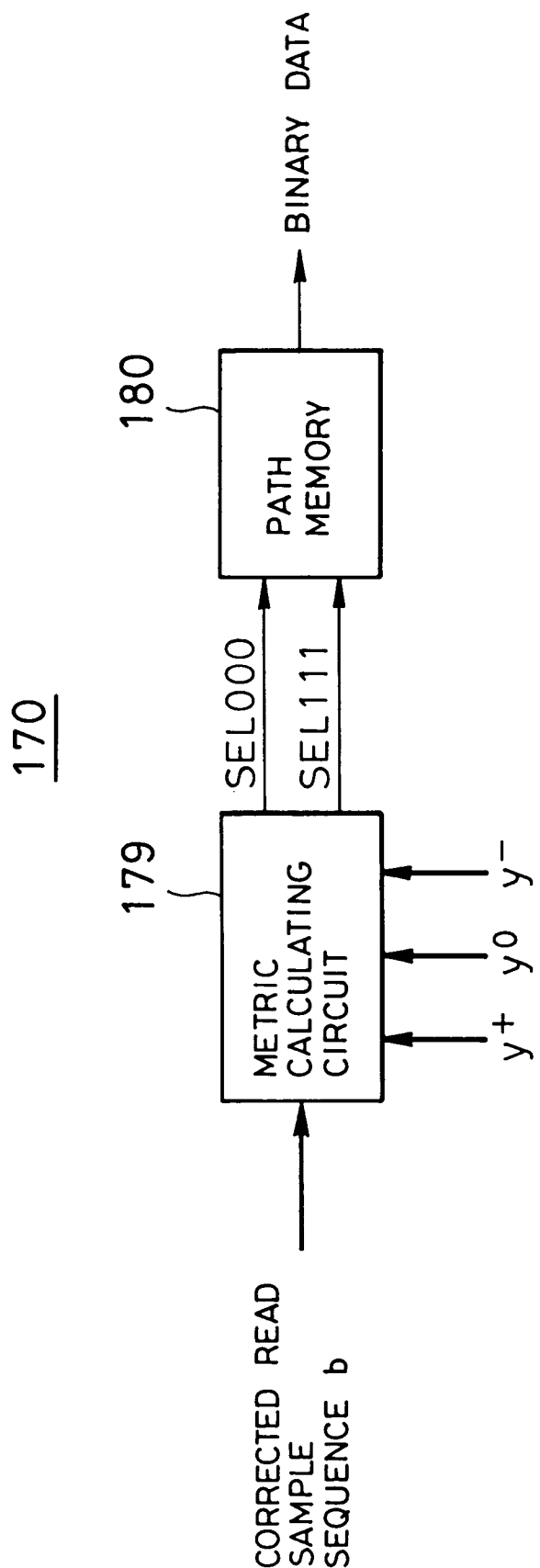
FIG. 5 is a block diagram illustrating the configuration of a Viterbi calculating circuit 170.

FIG. 5 is a block diagram illustrating the internal configuration of the Viterbi calculating circuit 170.

As illustrated in FIG. 5, the Viterbi calculating circuit 170 comprises a metric calculating circuit 179 and a path memory 180.

Figure 6:
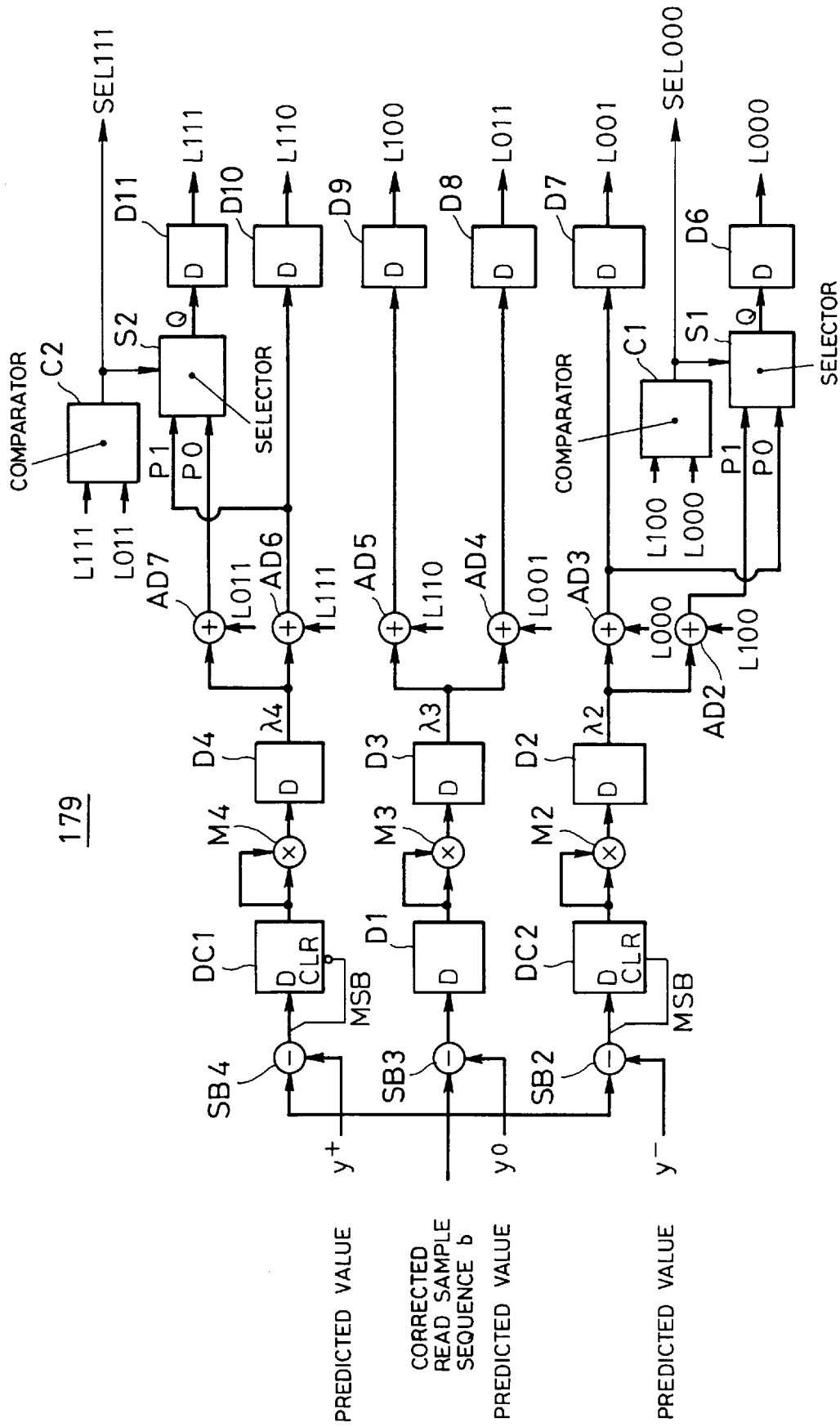
FIG. 6 is a block diagram illustrating the internal configuration of a metric calculating circuit 179.

FIG. 6 is a block diagram illustrating the internal configuration of the metric calculating circuit 179.

Referring specifically to FIG. 6, a subtracter SB2 subtracts the predicted value "y−", from the corrected read sample sequence "b" and supplies the subtraction value to a D-type flip-flop DC2. The D-type flip-flop DC2 fetches the value supplied from the subtracter SB2 each time the sampling clock is generated, and supplies the fetched value to a square circuit M2. It should be noted that the D-type flip-flop DC2 clears the fetched value to supply "0" to the square circuit M2 when the MSB of the value supplied from the subtracter SB2 is "1", i.e., when the value supplied from the subtracter SB2 is a negative value. A subtracter SB3 subtracts the predicted value "y0" from the corrected read sample sequence "b" and supplies the subtraction value to a D-type flip-flop D1. The D-type flip-flop D1 fetches the value supplied from the subtracter SB3 each time the sampling clock is generated, and supplies the fetched value to a square circuit M3.

A subtracter SB4 subtracts the predicted value "y+" from the corrected read sample sequence "b" and supplies the subtraction value to aD-type flip-flop DC1. The D-type flip-flop DC1 fetches the value supplied from the subtracter SB4 each time the sampling clock is generated, and supplies the fetched value to a square circuit M4. The D-type flip-flop DC1 clears the fetched value to supply "0" to the square circuit M4 when the MSB of the value supplied from the subtracter SB4 is "0", i.e., when the value supplied from the subtracter SB4 is a positive value.

The respective square circuits M2–M4 supply corresponding D-type flip-flops D2–D4 with the following square error values:

(corrected read sample sequence "b"–predicted value "y–")$^2$ (corrected read sample sequence "b"–predicted value "y0")$^2$ (corrected read sample sequence "b"–predicted value "y+")$^2$ The D-type flip-flops D2–D4 fetch the above square error values respectively at the sampling clock timing to output the square error values as branch metric values $\lambda 2$–$\lambda 4$.

An adder AD2 adds the branch metric value $\lambda 2$ and a path metric value L100 supplied from a D-type flip-flop D9, and supplies the addition value to a selector S1. An adder AD3 adds the branch metric value $\lambda 2$ and a path metric value L000 supplied from a D-type flip-flop D6 and supplies the addition value to each of the selector S1 and a D-type flip-flop D7.

A comparator C1 compares the path metric value L100 with the path metric value L000 in magnitude, and sets a path selection signal SEL000 to "0" when the path metric value L100 is equal to or larger than the path metric value L000. The comparator C1 sets the path selection signal SEL000 to "1" when the path metric value L100 is smaller than the path metric value L000. The selector S1 selects the addition result of the adder AD3 and supplies the selected addition result to the D-type flip-flop D6 when the path selection signal SEL000 is "0", i.e., when the path metric value L100 is equal to or larger than the path metric value L000, and selects the addition result of the adder AD2 and supplies the selected addition result to the D-type flip-flop D6 when the path selection signal SEL000 is "1", i.e., when the path metric value L100 is smaller than the path metric value L000. The D-type flip-flop D6 fetches the addition result supplied from the selector S1 each time the sampling clock is generated, and feeds same back to the adder AD3 and to the comparator C1, respectively, as the path metric value L000.

A D-type flip-flop D7 fetches the addition result supplied from the adder AD3 each time the sampling clock is generated, and feeds same back to an adder AD4 as a path metric value L001. The adder AD4 adds the branch metric value $\lambda 3$ and the path metric value L001 supplied from the D-type flip-flop D7 and supplies the addition result to a D-type flip-flop D8. The D-type flip-flop D8 fetches the addition result supplied from the adder AD4 each time the sampling clock is generated, and feeds same back to each of an adder AD7 and a comparator C2 as a path metric value L011. An adder AD5 adds the branch metric value $\lambda 3$ and a path metric value L001 supplied from a D-type flip-flop D10 and supplies the addition result to the D-type flip-flop D9.

The D-type flip-flop D9 fetches the addition result supplied from the adder AD5 each time the sampling clock is generated, and feeds same back to each of the adder AD2 and the comparator C1 as the path metric value L100. An adder AD6 adds the branch metric value $\lambda 4$ and a path metric value L111 supplied from a D-type flip-flop D11, later described, and supplies the addition result to the D-type flip-flop D10 and to a selector S2. The D-type flip-flop D10 fetches the addition result supplied from the adder AD6 each time the sampling clock is generated, and feeds same back to the adder AD5 as the path metric value L110. The adder AD7 adds the branch metric value $\lambda 4$ and the path metric value L011 supplied from the D-type flip-flop D8, and supplies the addition result to the selector S2.

The comparator C2 compares the path metric value L111 with the path metric value L011 in magnitude, and sets a path selection signal SEL111 to "0" when the path metric value L111 is equal to or larger than the path metric value L011. The comparator C2 sets the path selection signal SEL111 to "1" when the path metric value L111 is smaller than the path metric value L011. The selector S2 selects the addition result of the adder AD7 when the path selection signal SEL111 is "0", i.e., the path metric value L111 is equal to or larger than the path metric value L011, and supplies the selected addition result to the D-type flip-flop D11. The selector S2 selects the addition result of the adder AD6 when the path selection signal SEL111 is "1", i.e., when the path metric value L111 is smaller than the path metric value L011, and supplies the selected addition result to the D-type flip-flop D11. The D-type flip-flop D11 fetches the addition result supplied from the selector S2 each time the sampling clock is generated, and supplies same back to the adder AD6 and to the comparator C2, respectively, as the path metric value L111.

Figure 7:
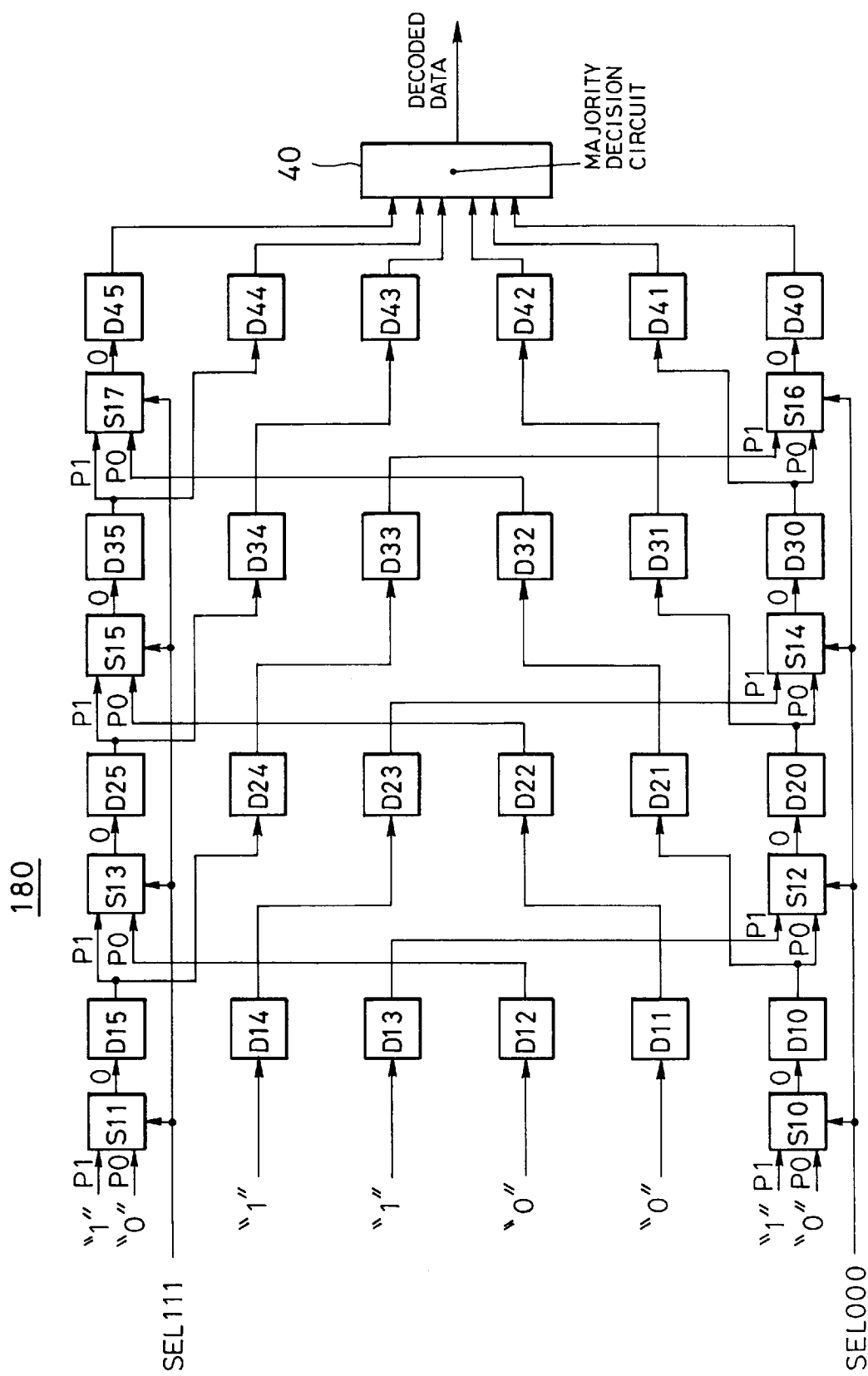
FIG. 7 is a block diagram illustrating an exemplary internal configuration of a path memory 180.

FIG. 7 is a block diagram illustrating an exemplary internal configuration of the path memory 180.

The path memory 180 updates a data sequence of logical value "1" and a logical value "0" in accordance with the values of the path selection signal SEL000 and the path selection signal SEL111, and outputs the updated data sequence as a decoded data sequence.

Each of the selectors S10, S12, S14, and S16 supplies a logical value of a signal supplied from an input terminal P0 of its own to the subsequent D-type flip-flop, when the logical value of the path selection signal SEL000 is "0". When the logical value of the path selection signal SEL000 is "1", each of the selectors S10, S12, S14, and S16 supplies a logical value of a signal supplied from an input terminal P1 of its own to the subsequent D-type flip-flop. Each of the selectors S11, S13, S15, and S17 supplies a logical value of a signal supplied from an input terminal P0 of its own to the subsequent D-type flip-flop, when the logical value of the path selection signal SEL111 is "0". When the logical value of the path selection signal SEL111 is "1", each of the selectors S11, S13, S15, and S17 supplies a logical value of a signal supplied from an input terminal P1 of its own to the subsequent D-type flip-flop. Each of D-type flip-flops D10–D15, D20–D25, D30–D35, and D40–D45 fetches a logical value of a signal supplied thereto each time the sampling clock is generated, and supplies the fetched logical value to a next stage.

A majority decision circuit 40 selects a most majority logical value from logical values of signals which are supplied thereto from each of the D-type flip-flops D40–D45, and outputs the selected most majority logical value as decoded binary data.

It should be noted that FIG. 7 illustrates an example which has four stages of circuits, however, an actual circuit is composed of approximately 10 stages to 100 stages.

As described above, the Viterbi decoder 18 is configured such that one of the respective predicted values is set to the value which is equal to a zero-cross sample value existing nearest to a zero-cross timing in the corrected read sample sequence "b". The rest of the predicted values are set to the values which are equal to respective adjacent samples before and after the zero-cross sample respectively.

For recording information data on an optical disc such as a CD or a DVD in accordance with RLL modulation encoding, a recording method called a "pit edge recording" is employed. This recording method forms pits and lands having lengths equal to recording pulses on an optical disc, where edge portions at both ends of a pit carry recorded information. When recorded information is reproduced from the optical disc, the recorded information is reproduced on the basis of zero-cross points of a read signal corresponding to edge portions of both ends of the pits. Therefore, it can be thought that zero-cross points and read samples existing before and after the respective zero-cross points account for a major part of recorded information also in the Viterbi decoding which uses a read sample sequence generated by A/D-converting a read signal. On the other hand, read signals at points away from zero-cross points, corresponding to central portions of pits and lands, may be vertically asymmetric due to expansion or contraction of the pit length which is called "asymmetry". In other words, read samples corresponding to read signals at positions away from zero-cross points exhibit a low reliability as data, and therefore correct decoding is difficult from such read samples in the Viterbi decoding.

To avoid possible troubles due to a low reliability, the Viterbi decoder 18 performs the Viterbi decoding while laying stress only on read samples at zero-cross points and read samples existing before and after the zero-cross points, which are highly reliable as data. The metric calculating circuit 179 illustrated in FIG. 5 forces the squire error value to "0" to prevent the performance of the Viterbi decoding from deteriorating when it is supplied with a read sample having a large absolute value which exists at a point away from a zero-cross point. Such an operation is implemented by a clear operation of the D-type flip-flops DC1, DC2, as described above.

Thus, predicted values required for performing the Viterbi decoding are only three: the predicted value "y−", the predicted value "y0", and the predicted value "y+", so that the metric calculating circuit 179 of FIG. 6 and the path memory of FIG. 7 can be largely reduced in scale.

It is therefore possible to highly reliably reproduce information from a high density recording medium with a small circuit scale without deteriorating the decoding performance.

Figure 8:
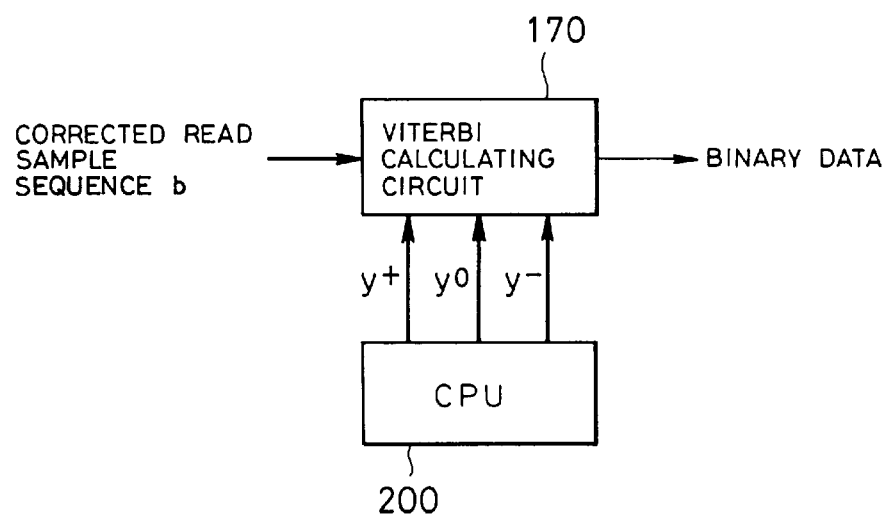
FIG. 8 is a block diagram illustrating another exemplary internal configuration of the Viterbi decoder 18.

In the foregoing embodiment, the three predicted values "y−", "y0", "y+" are sequentially generated from the corrected read sample sequence "b" in the predicted-value generator circuit 160. However, these three predicted values may be previously generated based on an experiment and supplied to the Viterbi calculating circuit 170 through a CPU (central processing unit) 200, as illustrated in FIG. 8.

For example, in a recorded information reproducing apparatus which is capable of reproducing recorded information from any of a single-layered DVD, a double-layered DVD, a write-once DVD, a rewritable DVD, and an optical disc such as a CD, sets of three optimal predicted values "y−", "y0", "y+" are stored for the respective discs such that a set of predicted values "y−", "y0", "y+" is supplied to the Viterbi calculating circuit 170 corresponding to a type of the disc from which recorded information is to be reproduced.

A sample extracting circuit 19 illustrated in FIG. 1 sequentially extracts only the sample values existing at the positions nearest to respective zero-cross points from the corrected read sample sequence "b" and supplies the extracted sample values to a D/A converter 20 as an extracted sample sequence "c".

Figure 9:
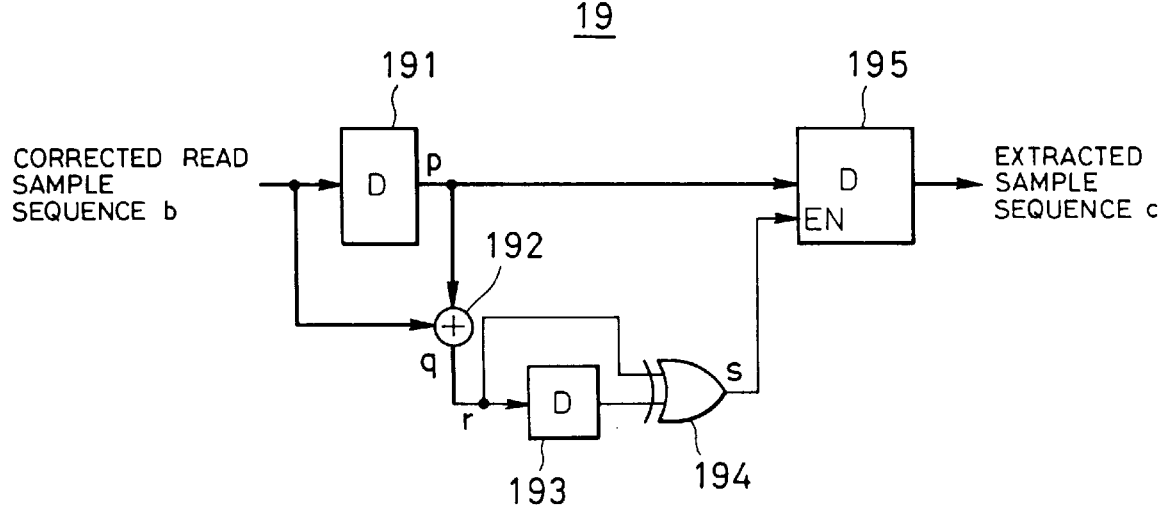
FIG. 9 is a block diagram illustrating the internal configuration of a sample extracting circuit 19.
Figure 10:
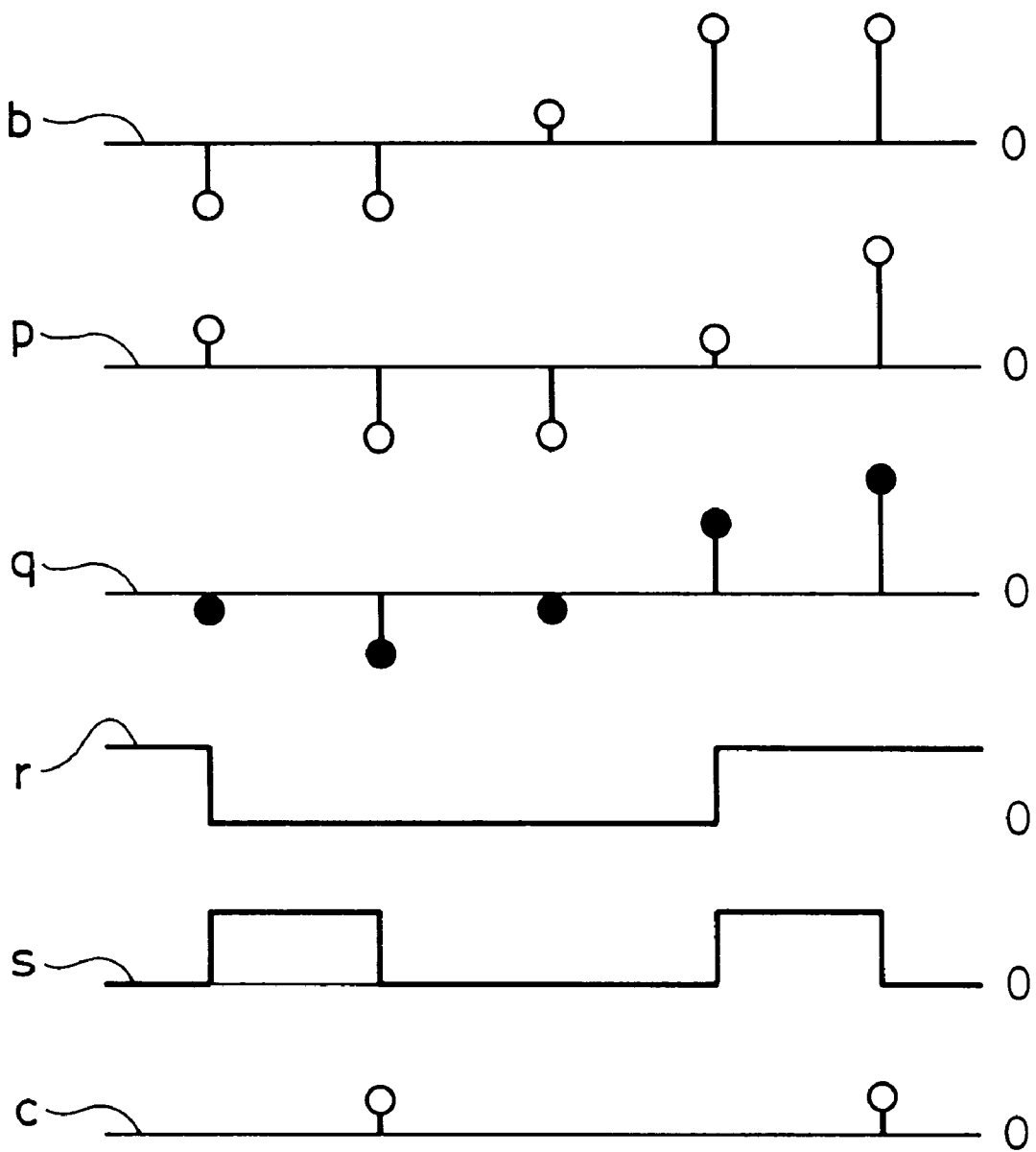
FIG. 10 shows operational waveform charts of the sample extracting circuit 19.

FIG. 9 is a block diagram illustrating an exemplary internal configuration of the sample extracting circuit 19, and FIG. 10 shows exemplary signal waveforms found in the sample extracting circuit 19.

Referring specifically to FIG. 9, a D-type flip-flop 191 fetches each sample value of the corrected read sample sequence "b" in response to the sampling clock signal, and supplies the fetched sample value to each of an adder 192 and a D-type flip-flop 195 as a corrected read sample sequence "p". The D-type flip-flop 191 and the adder 192 calculate an interpolated value "q" between respective samples in the corrected read sample sequence "b". A D-type flip-flop 193 and an exclusive OR circuit 194 generate a polarity inversion detecting pulse signal "s" when detecting a transition from "1" to "0" or from "0" to "1" of a bit signal "r" which is the MSB (most significant bit) of the interpolated value "q". The D-type flip-flop 195 fetches the corrected read sample sequence "p" in response to the polarity inversion detecting pulse signal "s" and outputs same as an extracted sample sequence "c".

Stated another way, the sample extracting circuit 19 illustrated in FIG. 9 extracts sample values, generated at points at which the polarity of the interpolated value "q" of the corrected read sample sequence "b" is inverted, from the corrected read sample sequence "b", i.e., the sample values existing at positions nearest to respective zero-cross points in the corrected read sample sequence "b".

The D/A converter 20 converts each sample value in the extracted sample sequence "c" into an analog signal having a level corresponding to the magnitude of the value, and supplies the analog signal to an LPF (low pass filter) 21 as an error signal "d". The LPF 21 smooths the error signal "d" and supplies the resulting signal to the subtracter 15 as an error voltage "e".

Figure 11:
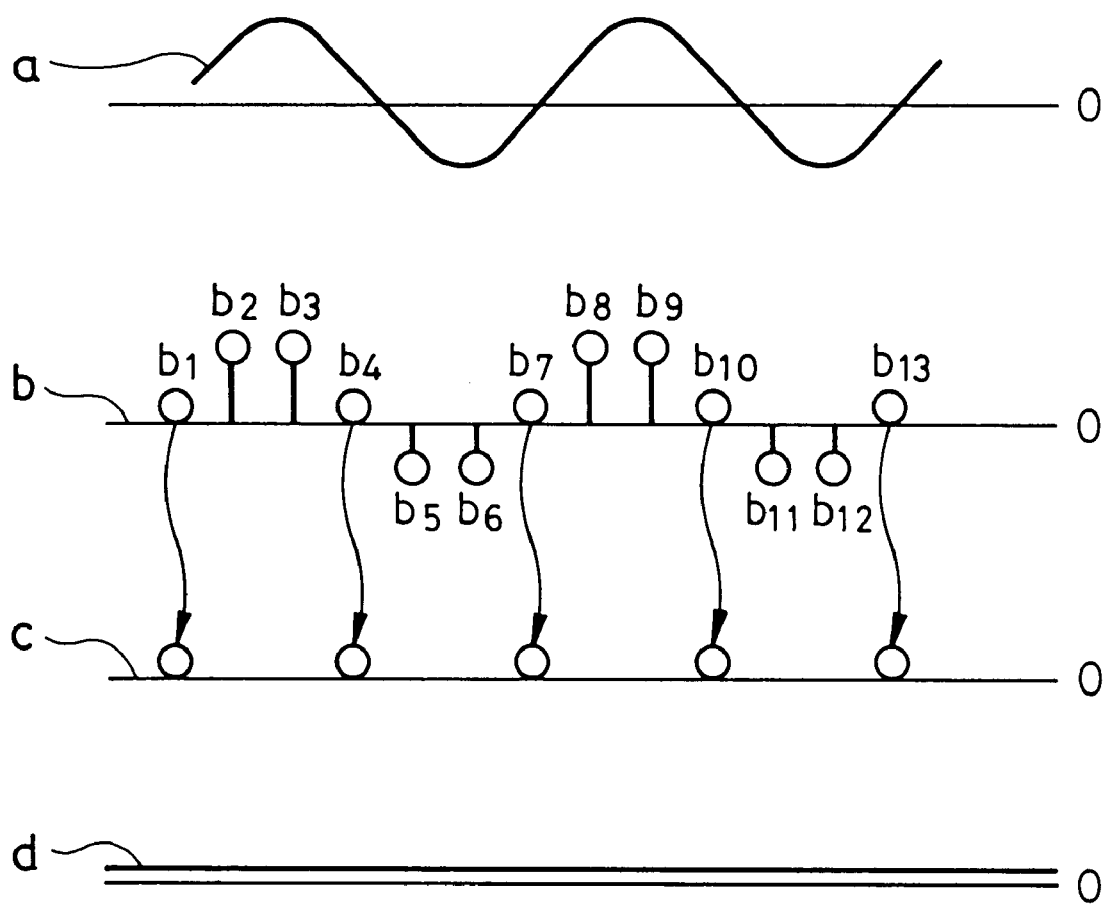
FIG. 11 shows operational waveforms of the recorded information reproducing apparatus according to the present invention.

FIG. 11 shows examples of internal operational waveforms in the recorded information reproducing apparatus illustrated in FIG. 1 (read signal "a", corrected read sample sequence "b", extracted sample sequence "c", and error signal "d").

During reproduction of information, if offset components overlap due to fluctuations in characteristics of the recording disc 12 and errors of a variety of servo mechanisms in a reproducing apparatus, the value of an actually derived read sample is shifted in level by the portion of the offset components.

For example, in the waveforms illustrated in FIG. 11, samples $b_1$, $b_4$, $b_7$, $b_{10}$, and $b_{13}$ in the corrected read sample sequence "b" should be at "0" in their correct states, however, they are entirely shifted in level by the portion of the offset components.

To solve this problem, the present invention extracts read samples, which should be at "0" in their correct states, from a read sample sequence generated by sampling a read signal "a" as an extracted sample sequence "c", converts the extracted sample sequence "c" into an analog signal as an error signal "d", and subtracts the error signal "d" from the read signal "a" to remove the offset components.

Thus, according to the recorded information reproducing apparatus as described above, offset components in a lower frequency band can be removed from a read signal. It is therefore possible to highly reliably reproduce information even from a recording medium such as a DVD which suffers from a large amount of low frequency components remaining in a read signal due to the 8/16 modulation encoding employed for the recording of information.

In the recorded information reproducing apparatus illustrated in FIG. 1, the extracted sample sequence "c" extracted by the sample extracting circuit 19 is D/A-converted to generate the error signal "d" on the assumption that the sampling clock signal generated by the PLL circuit 17 is synchronized with the read signal. However, the sampling signal can be in an instable state immediately after a search operation or a jump operation has been performed, so that the reproducing apparatus is more susceptible to malfunction in such a state.

Figure 12:
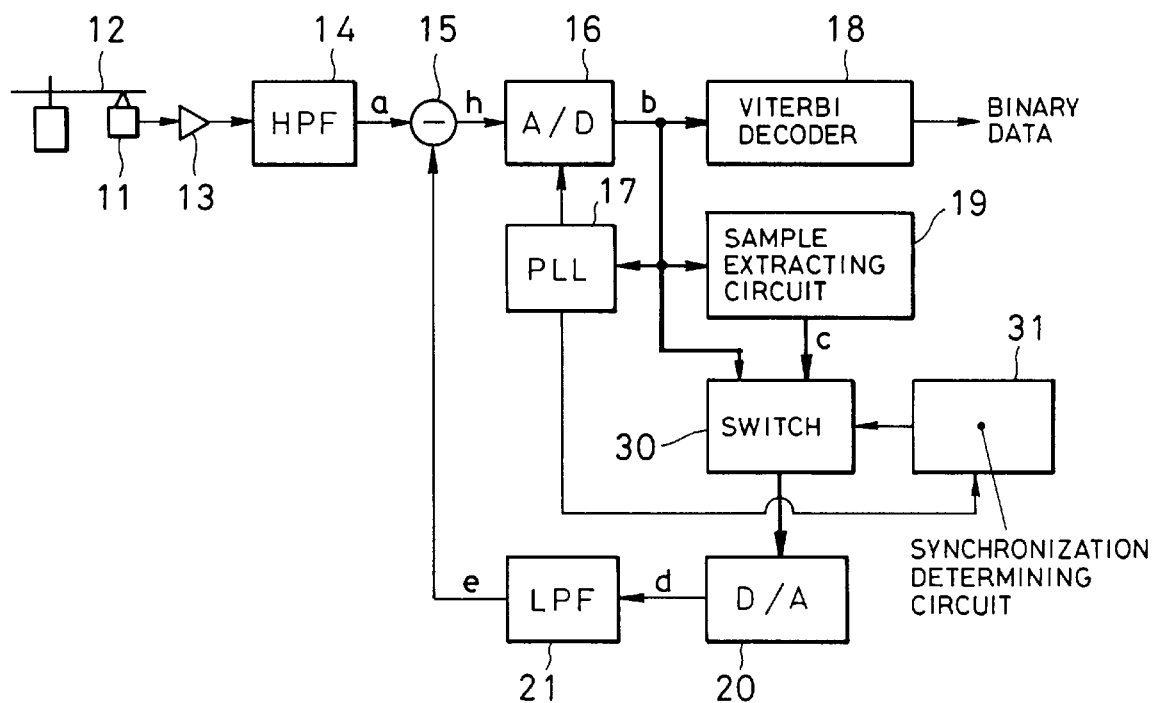
FIG. 12 is a block diagram illustrating another embodiment of the recorded information reproducing apparatus according to the present invention.

FIG. 12 is a block diagram illustrating the configuration of a recorded information reproducing apparatus according to another embodiment of the present invention which has been made in view of the problem mentioned above.

The recorded information reproducing apparatus illustrated in FIG. 12 includes a switch 30 and a synchronization determining circuit 31 between the sample extracting circuit 19 and the D/A converter 20 in the configuration illustrated in FIG. 1.

The synchronization determining circuit 31 determines whether or not a sampling signal generated by a PLL circuit 17 is synchronized with a read signal. The synchronization determining circuit 31 controls the switching of the switch 30 to supply the D/A converter 20 with the extracted sample sequence "c" outputted from the sample extracting circuit 19 during a period in which the sampling signal is determined to be synchronized with the read signal. On the other hand, the synchronization determining circuit 31 controls the switching of the switch 30 to supply a corrected read sample sequence "b" outputted from an A/D converter 16 during a period in which the sampling clock signal is determined not to be synchronized with the read signal.

As described above, the recorded information reproducing apparatus illustrated in FIG. 12 D/A-converts the extracted sample sequence "c" to generate the error signal "d" during a stable state of the sampling clock and D/A-converts the corrected read sample sequence "b" to generate the error signal "d" during an instable state of the sampling clock.

In other words, during an instable state of the sampling clock signal, the influence of phase shift of the sampling clock can be reduced by using the corrected read sample sequence "b" rather than the extracted sample sequence "c", so that the operation is switched to D/A-convert the corrected read sample sequence "b" to generate the error signal "d" during this period.

While in the embodiments illustrated in FIGS. 1 and 12, the error signal "d" is generated by D/A-converting each sample of the extracted sample sequence "c", a difference between a period in which the value of each sample has a positive polarity and a period in which the value of each sample has a negative polarity may be calculated to generate an error signal.

Figure 13:
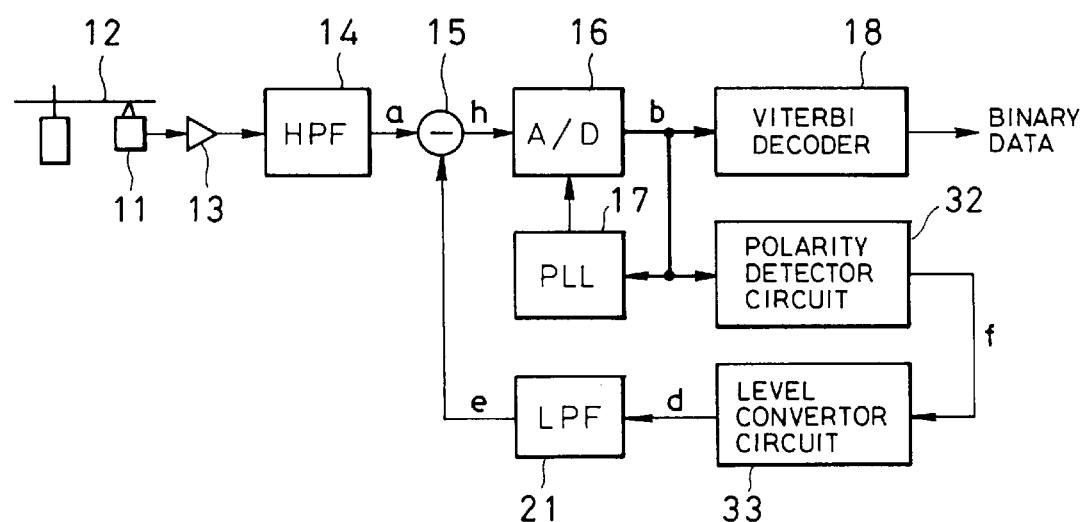
FIG. 13 is a block diagram illustrating a further embodiment of the recorded information reproducing apparatus according to the present invention.

FIG. 13 is a block diagram illustrating the configuration of a recorded information reproducing apparatus according to a further embodiment of the present invention which has been made in view of the aspect mentioned above.

Referring specifically to FIG. 13, a pickup 11 reads recorded information from a recording disc 12 to generate an analog read signal which is supplied to an RF amplifier 13. The RF amplifier 13 amplifies the read signal as desired and supplies the amplified read signal to an HPF 14. The HPF 14 removes a direct current component from the amplified read signal to generate a read signal "a" which is then supplied to a subtracter 15.

The subtracter 15 subtracts an error signal "e", later described, from the read signal "a" to generate a corrected read signal "h" which is supplied to an A/D converter 16. The A/D converter 16 samples the corrected read signal "h" in response to a sampling clock signal supplied thereto from a PLL (phase locked loop) circuit 17, later described, to convert the corrected read signal "h" into a digital corrected read sample sequence "b". The PLL circuit 17 generates a clock signal synchronized in phase with the corrected read sample sequence "b", and supplies the clock signal to the A/D converter 16 as the above-mentioned sampling clock signal.

A Viterbi decoder 18 decodes the most likely binary reproduced data based on the corrected read sample sequence "b", and outputs the decoded data.

A polarity detector circuit 32 detects the polarity of the corrected read sample sequence "b" only at a point at which the corrected read sample sequence "b" exhibits a change in polarity, and supplies a level converter circuit 33 with a polarity signal "f" having a logical value corresponding to the detected polarity.

Figure 14:
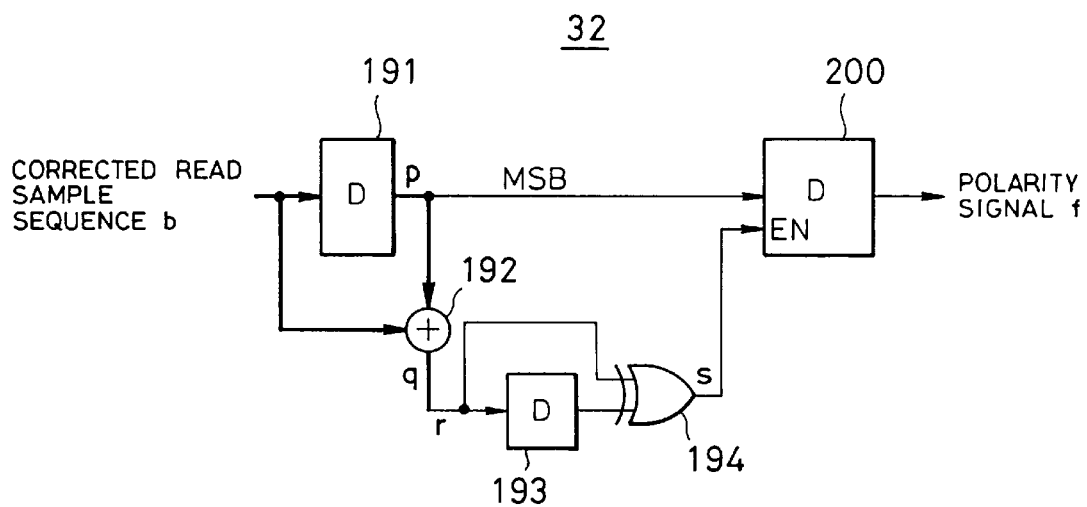
FIG. 14 is a block diagram illustrating the internal configuration of a polarity detector circuit 32.

FIG. 14 is a block diagram illustrating the internal configuration of the polarity detector circuit 32.

Referring specifically to FIG. 14, a D-type flip-flop 191 fetches each sample value of the corrected read sample sequence "b" in response to the sampling clock signal, and supplies the fetched sample value to an adder 192 as a corrected read sample sequence "p". The D-type flip-flop 191 and the adder 192 calculate an interpolated value "q" between respective samples in the corrected read sample sequence "b". A D-type flip-flop 193 and an exclusive OR circuit 194 generate a polarity inversion detecting pulse signal "s" s when detecting a transition from "1" to "0" or from "0" to "1" of a bit signal "r" which is the MSB (most significant bit) of the interpolated value "q". A D-type flip-flop 200 fetches a logical signal value of the MSB in the corrected read sample sequence "p" in response to the polarity inversion detecting pulse signal "s", and outputs the fetched logical signal value as a polarity signal "f".

The level converter circuit 33 generates an error signal "d" having a voltage corresponding to the logical signal value of the polarity signal "f". For example, the level converter circuit 33 generates the error signal "d" having a voltage of +5 [V] when supplied with the polarity signal "f" having a logical value "0" indicative of the positive polarity. And the level converter circuit 33 generates the error signal "d" having a voltage of −5[V] when supplied with the polarity signal "f" having a logical value "1" 11 indicative of the negative polarity. An LPF 21 smooths the error signal "d", and supplies the resulting signal to the subtracter 15 as an error voltage "e".

In accordance with the operations of the polarity detector circuit 32, the level converter circuit 33, and the LPF 21, the error voltage "e" is generated corresponding to a difference between a period in which the value of each sample in the extracted sample sequence "c" has the positive polarity and a period in which the value of each sample in the extracted sample sequence "c" has the negative polarity.

Figure 15:
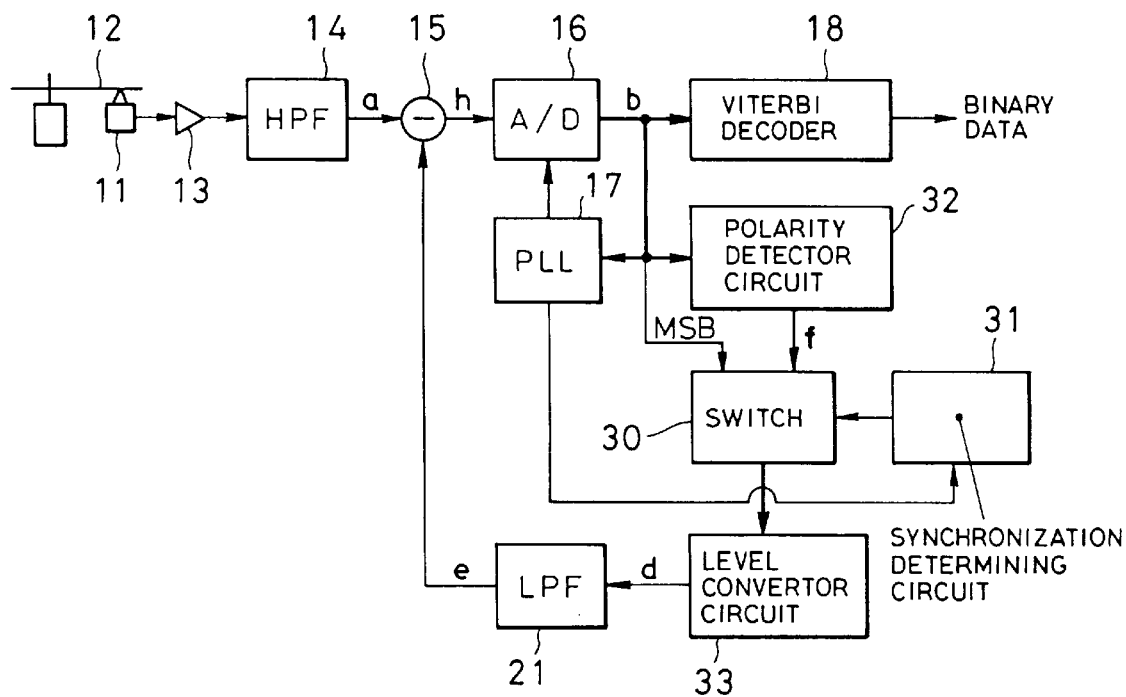
FIG. 15 is a block diagram illustrating a further embodiment of the recorded information reproducing apparatus according to the present invention.

In the alternative, the configuration illustrated in FIG. 13 may be combined with the switch 30 and the synchronization determining circuit 31 illustrated in the aforementioned FIG. 12 to realize a configuration as illustrated in FIG. 15.

In the configuration illustrated in FIG. 15, during a stable period of the sampling clock, an error voltage "e" is calculated corresponding to a difference between a period in which the value of each sample in the extracted sample sequence "c" has the positive polarity and a period in which the value of each sample has the negative polarity. On the other hand, during an instable period of the sampling clock, the error voltage "e" is calculated corresponding to a difference between a period in which the value of each sample in the corrected read sample sequence "b" has the positive polarity and a period in which the value of each sample has the negative polarity.

In FIG. 15, the MSB of each sample in the corrected read sample sequence "b" is used as a polarity signal for indicating whether each sample of the corrected read sample sequence "b" has the positive polarity or the negative polarity.

Also, in place of the D/A converter 20 illustrated in FIGS. 1 and 12, a PWM (pulse width modulation) circuit may be used to generate the error signal "d" having a pulse width corresponding to the value of each sample in the extracted sample sequence "c".

Further, the LPF 21 and the subtracter 15 illustrated in FIGS. 1, 12, 13, and 15 may be formed of an inverting integrator circuit comprising an operational amplifier.

While in FIGS. 1 and 12, the analog error signal "d" after D/A conversion is smoothed by the LPF 21 to generate the error signal "e", the digital extracted sample sequence before D/A conversion may be smoothed using a digital filter to generate the error signal "e". The sample extracting circuit 19 in the foregoing embodiment may be configured such that inverted polarity of the corrected read sample sequence "b" is detected, and the one having the smaller absolute value may be selected as a component of the extracted sample sequence "c" from two samples before and after the inversion.

In the embodiments illustrated in FIGS. 12 and 15, the synchronization determining circuit 31 determines whether or not the sampling clock signal is synchronized with a read signal, however, the function of the synchronization determining circuit 31 may be implemented in a CPU (not shown) which should be provided for performing a variety of controls for the recorded information reproducing apparatus.

In addition, the recorded information reproducing apparatuses in the foregoing embodiments may be provided with a drop-out compensating circuit for compensating for drop-out due to scratches or stain on the recording disc 12.

For example, if drop-out is detected in the recorded information reproducing apparatuses illustrated in FIGS. 1 and 12, the D/A converter 20 is forcedly supplied with a zero level signal. As another example, if drop-out is detected in the recorded information reproducing apparatuses illustrated in FIGS. 13 and 15, the level converter circuit 32 is forcedly supplied with a signal which changes its polarity with the duty ratio being 50%. With this configuration, since the error signal "d" is at zero level when drop-out occurs, it is possible to prevent erroneous operations due to the occurrence of drop-out.

With the operation of the subtracter 14, the value of the zero-cross sample in the corrected read sample sequence "b" outputted from the A/D converter 16 actually becomes zero level.

Figure 16:
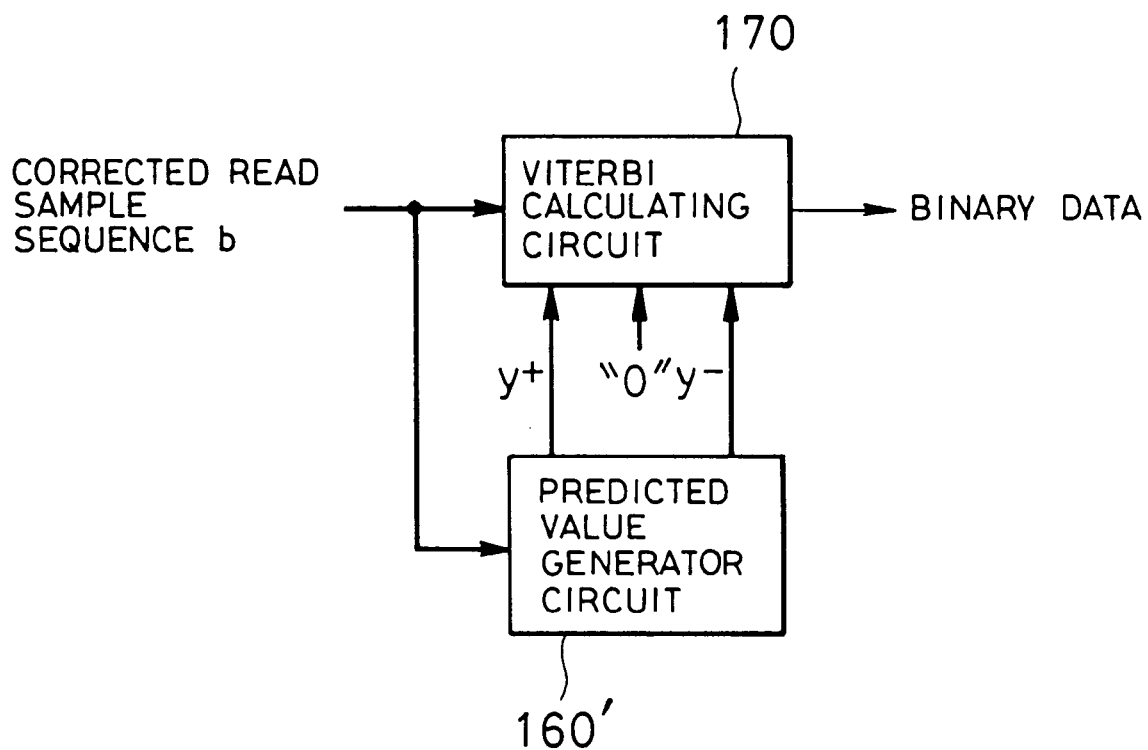
FIG. 16 is a block diagram illustrating another exemplary internal configuration of the Viterbi decoder 18.

To implement the function mentioned above, the Viterbi decoder 18 may be configured as illustrated in FIG. 16. A predicted-value generator circuit 160' extracts a positive polarity sample "u" and a negative polarity sample "w" respectively existing before and after each zero-cross sample from the read sample sequence "b", and supplies the Viterbi calculating circuit 170 with average values of the respective positive polarity samples "u" and negative polarity samples "w" as the predicted value "y+" and the predicted value "y−". In this event, the Viterbi calculating circuit 170 is supplied with a fixed value "0" as one of the predicted values.

Stated another way, the subtracter 15 causes the value of the zero-cross sample in the corrected read sample sequence "b" to be at zero level without fail, so that the zero level of the fixed value may be used as it is as the predicted value "y0". This configuration permits a circuit portion associated with the predicted value "y0" illustrated in FIGS. 3 and 6 to be omitted.

Since the frequency characteristic of the optical disc reproducing system exhibits a high frequency band attenuating characteristic, the amplitude of the shortest run-length waveform is minimum in a read signal waveform when recorded using an RLL modulation code. Thus, when RLL modulation encoded signals recorded on an optical disc are read, the shortest run-length waveform is highly likely to cause read errors.

To attend to the problem mentioned above, the predicted-value generator circuit 160 may be configured such that the predicted value "y+" and the predicted value, "y−" are detected only when the run length is the shortest, instead of detecting all of positive and negative samples before and after zero-cross points. Then, predicted values are set corresponding to the shortest run-length waveforms to allow for a further reduction in decoding errors in the Viterbi calculating circuit 170.

Also, in the detection of the predicted value "y+" and the predicted value "y−" in the predicted-value generator circuit 160, the shortest value of samples before and after zero-cross points may be detected taking advantage of the nature of the shortest run-length waveform which has the smallest amplitude.

Further, in the detection of the predicted value "y+" and the predicted value "y−" in the predicted-value generator circuit 160, absolute values of sample values may be detected on the assumption that the predicted value "y+" and the predicted value "y−" are substantially symmetric with respect to the zero level. In this event, a detected absolute value with the positive polarity is assigned to the predicted value "y+", while the detected absolute value with the negative polarity is assigned to the predicted value "y−".

While the foregoing embodiments have been described for the case where three predicted values are used, the present invention is not limited to this particular number of predicted values. For example, an even number of predicted values such as four may also be used. In this event, the sampling clock in the A/D converter 16 is in opposite phase to a zero-cross point, and a total of four samples, i.e., two samples each before and after the zero-cross point are used as predicted values.

According to the recorded information reproducing apparatus of the present invention as described above, offset components in a low frequency band can be removed from a read signal.

It is therefore possible to highly reliably reproduce information even from a recording medium such as a DVD which suffers from a large amount of low frequency components remaining in a read signal due to the 8/16 modulation encoding which is employed for the recording of information.

What is claimed is:

1. A recorded information reproducing apparatus for reproducing recorded information recorded on a recording medium, comprising:

information reading means for reading recorded information from said recording medium to generate an analog read signal;

a subtracter for subtracting an error voltage from said read signal to generate a corrected read signal;

an A/D converter for sampling said corrected read signal in response to a sampling clock signal to convert said corrected read signal into a digital corrected read sample sequence;

decoding means for decoding said recorded information from said corrected read sample sequence;

sample extracting means for extracting a sample existing at a position nearest to each zero-cross point in said corrected read sample sequence to generate an extracted sample sequence;

synchronization determining means for determining whether or not said sampling clock signal is synchronized with said corrected read signal; and error voltage generating means for converting each sample in said extracted sample sequence into an analog signal as said error voltage when determining that said sampling clock signal is synchronized with said corrected read signal, and for converting each sample in said corrected read sample sequence into an analog signal as said error voltage when determining that said sampling clock signal is not synchronized with said corrected read signal.

2. The recorded information reproducing apparatus according to claim 1, wherein said sample extracting means includes:

interpolated value calculating means for calculating an interpolated value for each sample in said corrected read sample sequence;

polarity inversion detecting means for generating a polarity inversion detecting signal when detecting that the polarity of said interpolated value is inverted; and storing means for fetching said corrected read sample sequence in response to said polarity inversion detecting signal to output the fetched sample sequence as said extracted sample sequence.

3. A recorded information reproducing apparatus for reproducing recorded information recorded on a recording medium, comprising:

information reading means for reading recorded information from said recording medium to generate an analog read signal;

a subtracter for subtracting an error voltage from said read signal to generate a corrected read signal;

an A/D converter for sampling said corrected read signal in response to a sampling clock signal to convert said corrected read signal into a digital corrected read sample sequence;

decoding means for decoding said recorded information from said corrected read sample sequence;

synchronization determining means for determining whether or not said sampling clock signal is synchronized with said corrected read signal; and error voltage generating means for generating a voltage corresponding to a polarity of a sample existing at a position nearest to a zero-cross point in said corrected read sample sequence as said error voltage when determining that said sampling clock signal is synchronized with said corrected read signal, and for generating a voltage corresponding to a polarity of each sample in said corrected read sample sequence as said error voltage when determining that said sampling clock signal is not synchronized with said corrected read signal.

4. The recorded information reproducing apparatus according to claim 3, wherein said error voltage generating means includes:

polarity detecting means for detecting whether a polarity of each sample positioned at a position nearest to each of the zero-cross points in said corrected read sample sequence is positive or negative, to generate a polarity signal indicative of the detected polarity; and level converting means for generating a voltage corresponding to a polarity indicated by said polarity signal as said error voltage.

5. The recorded information reproducing apparatus according to claim 4, wherein said polarity detecting means includes:

interpolated value calculating means for calculating an interpolated value for each sample in said corrected read sample sequence;

polarity inversion detecting means for generating a polarity inversion detecting signal when detecting that a polarity of said interpolated value is inverted; and storing means for fetching a MSB of a sample value in said corrected read sample sequence in response to said polarity inversion detecting signal to output the fetched MSB as said polarity signal.

6. The recorded information reproducing apparatus according to claims 1 or 3 wherein:

said decoding means is a Viterbi decoder for decoding information data based on an error between said corrected read sample sequence and each of a plurality of predicted values, and one of the predicted values is equal to a zero level, and the rest of the predicted values are equal to adjacent samples before and after a zero-cross sample existing at a position nearest to a zero-cross point in said corrected read sample sequence, respectively.

7. The recorded information reproducing apparatus according to claims 1 or 3, wherein:

said decoding means is a Viterbi decoder for decoding information data based on an error between said corrected read sample sequence and each of a plurality of predicted values, and said Viterbi decoder includes predicted value generating means for extracting a zero-cross sample existing at a position nearest to a zero-cross point in said corrected read sample sequence and for extracting respective adjacent samples before and after said zero-cross sample in said corrected read sample sequence to generate said extracted samples as said predicted values.

8. A recorded information reproducing apparatus for reproducing recorded information recorded on a recording medium, comprising:

information reading means for reading recorded information from said recording medium to generate an analog read signal;

a subtracter for subtracting an error voltage from said read signal to generate a corrected read signal;

an A/D converter for sampling said corrected read signal to convert said corrected read signal into a digital corrected read sample sequence;

decoding means for decoding said recorded information from said corrected read sample sequence;

sample extracting means for extracting a sample existing at a position nearest to each zero-cross point in said corrected read sample sequence to generate an extracted sample sequence; and error voltage generating means for converting each sample in said extracted sample sequence into an analog signal as said error voltage;

wherein said decoding means is a Viterbi decoder for decoding information data based on an error between said corrected read sample sequence and each of a plurality of predicted values, and one of the predicted values is equal to a zero level, and the rest of the predicted values are equal to adjacent samples before and after a zero-cross sample existing at a position nearest to a zero-cross point in said corrected read sample sequence, respectively.

9. A recorded information reproducing apparatus for reproducing recorded information recorded on a recording medium, comprising:

information reading means for reading recorded information from said recording medium to generate an analog read signal;

a subtracter for subtracting an error voltage from said read signal to generate a corrected read signal;

an A/D converter for sampling said corrected read signal to convert said corrected read signal into a digital corrected read sample sequence;

decoding means for decoding said recorded information from said corrected read sample sequence; and error voltage generating means for generating a voltage corresponding to a polarity of a sample existing at a position nearest to a zero-cross point in said corrected read sample sequence as said error voltage;

wherein said decoding means is a Viterbi decoder for decoding information data based on an error between said corrected read sample sequence and each of a plurality of predicted values, and one of the predicted values is equal to a zero level, and the rest of the predicted values are equal to adjacent samples before and after a zero-cross sample existing at a position nearest to a zero-cross point in said corrected read sample sequence, respectively.

* * * * *